(12) United States Patent
Yokohashi et al.

(10) Patent No.: US 11,494,943 B2
(45) Date of Patent: Nov. 8, 2022

(54) IMAGE PROCESSING APPARATUS, IMAGE FORMING APPARATUS, SIMPLIFIED COLOR CHART, AND NON-TRANSITORY COMPUTER READABLE MEDIUM STORING IMAGE PROCESSING PROGRAM

(71) Applicant: FUJIFILM Business Innovation Corp., Tokyo (JP)

(72) Inventors: Mami Yokohashi, Kanagawa (JP); Yusuke Izumisawa, Kanagawa (JP); Kota Matsuo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 173 days.

(21) Appl. No.: 16/840,457

(22) Filed: Apr. 6, 2020

(65) Prior Publication Data

US 2021/0134015 A1    May 6, 2021

(30) Foreign Application Priority Data

Nov. 6, 2019  (JP) .............................. JP2019-201614

(51) Int. Cl.
| | |
|---|---|
| *G06T 7/90* | (2017.01) |
| *H04N 1/60* | (2006.01) |
| *H04N 1/047* | (2006.01) |
| *G06T 1/60* | (2006.01) |
| *G06T 1/20* | (2006.01) |

(52) U.S. Cl.
CPC .............. *G06T 7/90* (2017.01); *H04N 1/047* (2013.01); *H04N 1/6008* (2013.01); *G06T 1/20* (2013.01); *G06T 1/60* (2013.01)

(58) Field of Classification Search
CPC .... G06T 7/90; G06T 1/20; G06T 1/60; H04N 1/047; H04N 1/6008
USPC .......................................... 358/518, 1.9, 1.15
See application file for complete search history.

(56) References Cited

U.S. PATENT DOCUMENTS

| | | | |
|---|---|---|---|
| 9,749,500 B2 | 8/2017 | Tsuji | |
| 10,129,438 B2 | 11/2018 | Yamaguchi | |
| 2005/0237549 A1* | 10/2005 | Oh ....................... | H04N 1/6033 358/1.9 |
| 2011/0058196 A1* | 3/2011 | Teraue ................. | H04N 1/6033 358/1.9 |

FOREIGN PATENT DOCUMENTS

| | | |
|---|---|---|
| JP | 2016118674 | 6/2016 |
| JP | 6120184 | 4/2017 |
| JP | 2018011101 | 1/2018 |

\* cited by examiner

*Primary Examiner* — Quang N Vo
(74) *Attorney, Agent, or Firm* — JCIPRNET

(57) ABSTRACT

An image processing apparatus includes a processor configured to generate a second color chart from a first color chart. The second color chart includes multiple color samples selected from multiple color samples included in the first color chart, and the second color chart is generated in such a manner that a color sample included in the second color chart is located in the second color chart at a position at least maintaining a partial-adjacency relationship in the first color chart.

5 Claims, 14 Drawing Sheets

IMAGE PROCESSING APPARATUS, IMAGE FORMING APPARATUS, SIMPLIFIED COLOR CHART, AND NON-TRANSITORY COMPUTER READABLE MEDIUM STORING IMAGE PROCESSING PROGRAM

CROSS-REFERENCE TO RELATED APPLICATIONS

This application is based on and claims priority under 35 USC 119 from Japanese Patent Application No. 2019-201614 filed Nov. 6, 2019.

BACKGROUND

(i) Technical Field

The present disclosure relates to an image processing apparatus, an image forming apparatus, a simplified color chart, and a non-transitory computer readable medium storing an image processing program.

(ii) Related Art

Japanese Unexamined Patent Application Publication No. 2016-118674 discloses an image forming apparatus including an image forming unit that forms an image on a sheet and a controller that controls the image forming unit to form on a sheet a pattern image for calibration. The pattern image is formed so that a plurality of patches having different gradations are arranged next to each other. Each of the plurality of patches has a first area that contains an effective region from which read data is obtained for the calibration. At least one of the patches located on the perimeter of the pattern image further includes a second area that has the same gradation as the first area and that extends toward the outside.

Japanese Unexamined Patent Application Publication No. 2018-011101 discloses a color conversion apparatus for converting RGB values into colorimetric values provided by L*a*b* values or XYZ values. The RGB values are obtained from the measurement of a color chart printed by a printer. The color conversion apparatus includes a scanner profile acquiring unit, a table forming unit, and a color conversion unit. The scanner profile acquiring unit obtains a scanner profile that associates measured RGB values with corresponding measured colorimetric values. The measured RGB values and the measured colorimetric values both are obtained from the measurement of patches in a first color chart printed by the printer. A correction amount of RGB value varies in accordance with a level of flare, and the table forming unit creates and stores in a storage unit a table that associates each correction amount of RGB value with an RGB-value difference and a patch-size difference. The table is created based on RGB values of patches in the first color chart and in a specific chart created by changing RGB values or patch sizes of some of the patches in the first color chart. The color conversion unit references the table and corrects RGB values obtained from the measurement of patches in a second color chart whose RGB values or patch sizes differ from the RGB values or patch sizes of the first color chart. Then, the color conversion unit converts the corrected RGB values into colorimetric values with reference to the scanner profile.

Japanese Patent No. 6120184 discloses a chart creation method to be used in a system including an image forming apparatus and a control apparatus. The image forming apparatus includes a print section and a color measurement section, and the control apparatus controls the image forming apparatus. In the chart creation method, a first chart creation process, a rearrangement process, and a second chart creation process are performed. In the first chart creation process, the control apparatus creates a print image of a chart in which a plurality of patches are arranged. Then, the control apparatus provides the image forming apparatus with instructions to print the chart and to measure colors in the chart, and the image forming apparatus prints the chart and measures colors of patches in the chart. In the rearrangement process, the control apparatus obtains measured color values of the patches in the chart from the image forming apparatus and rearranges the patches so as to restrict the spread of average measured color values in the chart within a predetermined range. The average measured color value is calculated for each subgroup of patches. A subgroup includes a target patch whose color is to be measured and at least one patch located in the vicinity of the target patch, and the average measured color value is obtained by averaging measured color values of the patches included in a subgroup. In the second chart creation process, the control apparatus creates a print image of a chart in which patches are rearranged. The control apparatus provides the image forming apparatus with instructions to print the chart and to measure the colors in the chart, and the image forming apparatus prints the chart, in which the patches are rearranged, and measures colors of patches in the chart.

SUMMARY

A simplified color chart is sometimes used to simplify the process of reading a color chart by using a colorimeter. The number of color samples included in a simplified color chart is smaller than the number of color samples included in a basic color chart. The area in a sheet (for example, an A3-sized sheet) occupied by all the color samples included in a simplified color chart is smaller than the area occupied by all the color samples included in a basic color chart, and thus each color sample in a simplified color chart is susceptible to an effect, such as flare, originating from a surrounding white space. This effect leads to a difference between the condition under which color samples included in a basic color chart are read and the condition under which color samples included in a simplified color chart are read.

Aspects of non-limiting embodiments of the present disclosure relate to providing an image processing apparatus, an image forming apparatus, a simplified color chart, and a non-transitory computer readable medium storing an image processing program that can reduce the effect that is exerted by a white space around color samples and by irregular reflections from an area around color samples when the color samples included in a simplified color chart are read.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

To address the above issues, according to an aspect of the present disclosure, there is provided an image processing apparatus including a processor configured to generate a second color chart from a first color chart. The second color chart includes a plurality of color samples selected from a plurality of color samples included in the first color chart, and the second color chart is generated in such a manner that a color sample included in the second color chart is located in the second color chart at a position at least maintaining a partial-adjacency relationship in the first color chart.

BRIEF DESCRIPTION OF THE DRAWINGS

Exemplary embodiments of the present disclosure will be described in detail based on the following figures, wherein.

DETAILED DESCRIPTION

First Exemplary Embodiment

Hereinafter, exemplary embodiments of an image processing apparatus and an image forming apparatus according to the present disclosure will be described.

Configuration in First Exemplary Embodiment

Figure 1:
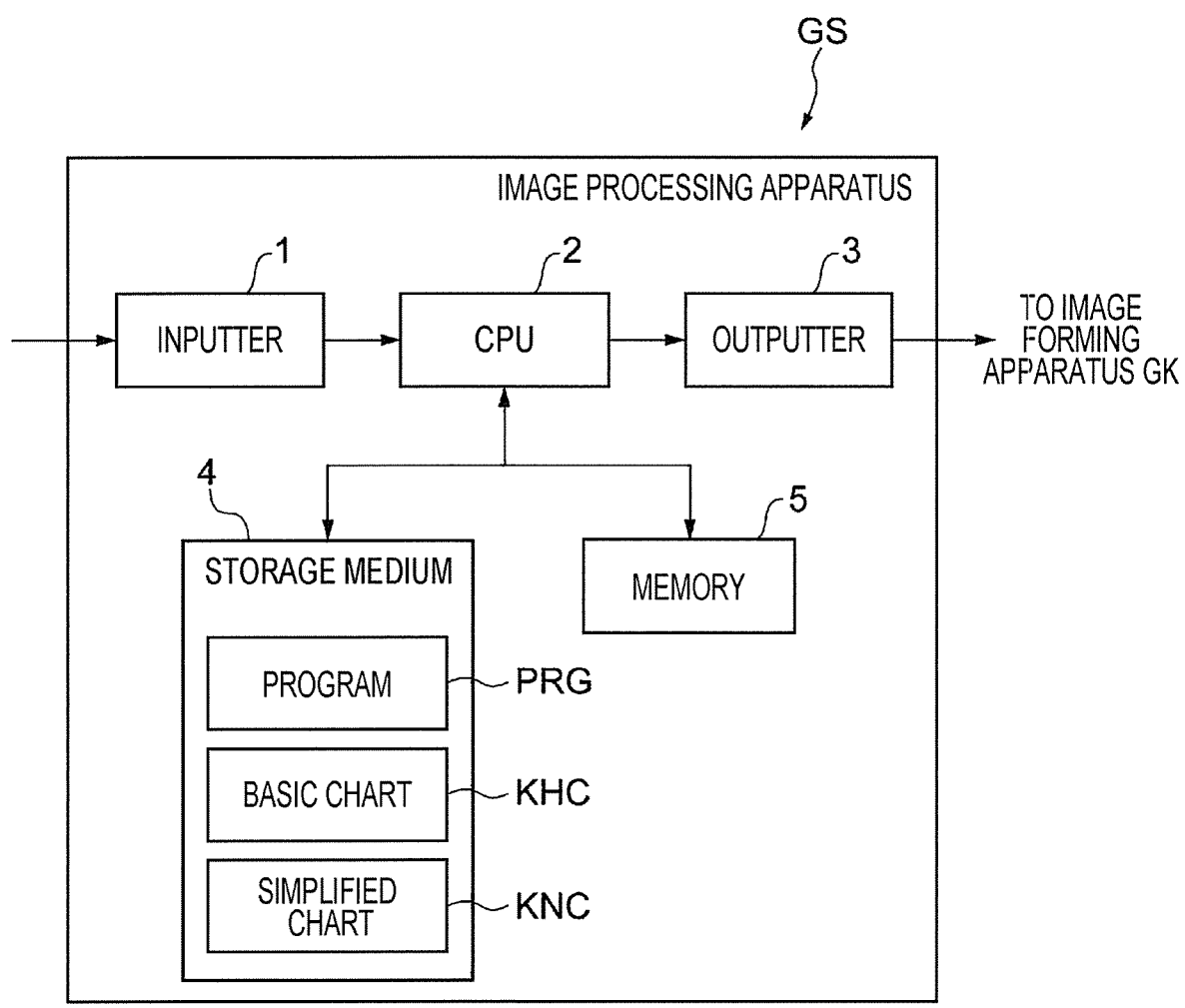
FIG. 1 illustrates a configuration of an image processing apparatus according to a first exemplary embodiment.

FIG. 1 illustrates a configuration of an image processing apparatus according to a first exemplary embodiment. The configuration of the image processing apparatus according to the first exemplary embodiment will be described below with reference to FIG. 1.

An image processing apparatus GS according to the first exemplary embodiment includes an inputter 1, a central processing unit (CPU) 2, an outputter 3, a storage medium 4, and a memory 5 as illustrated in FIG. 1.

The inputter 1 is constituted, for example, by a keyboard, a mouse, and a touch panel. The CPU 2 is an example of a processor and a core of a widely known computer and operates hardware in accordance with software control. The outputter 3 is constituted, for example, by a printer, a liquid crystal monitor, and a network connection unit. The storage medium 4 is constituted, for example, by a hard disk drive (HDD), a solid state drive (SSD), and/or a read-only memory (ROM). The memory 5 is constituted, for example, by a dynamic random-access memory (DRAM) and/or a static random-access memory (SRAM).

The storage medium 4 stores a program PRG, a basic chart KHC, and a simplified chart KNC. The program PRG is formed by a group of instructions that specify process actions to be performed by the image processing apparatus GS. The basic chart KHC is a color chart used for creating a color conversion profile of the image processing apparatus GS. The basic chart KHC is an example of a "first color chart" and a "basic color chart". The simplified chart KNC is a color chart created based on the basic chart KHC to simplify the creation of the color conversion profile mentioned above. The simplified chart KNC is an example of a "second color chart" and a "simplified color chart".

Figure 2:
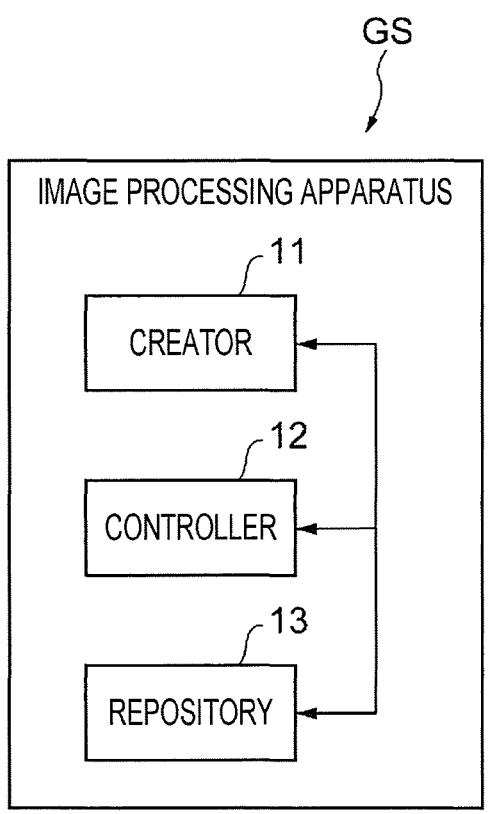
FIG. 2 is a functional block diagram of the image processing apparatus according to the first exemplary embodiment.

FIG. 2 is a functional block diagram of the image processing apparatus GS according to the first exemplary embodiment.

The image processing apparatus GS includes a creator 11, a controller 12, and a repository 13 as illustrated in FIG. 2.

The hardware configuration and the functional configuration of the image processing apparatus GS are related in such a manner that the CPU 2 executes on hardware the program PRG stored in the storage medium 4, which realizes a portion of the function of the repository 13, by using the memory 5, which realizes another portion of the function of the repository 13. The CPU 2 controls operations of the inputter 1 and the outputter 3 on hardware as necessary and realizes functions of the creator 11 and the controller 12. Consequently, for example, the image processing apparatus GS outputs the simplified chart KNC created by the creator 11 (a regular simplified chart SKNC illustrated in FIG. 9) from the outputter 3 to an image forming apparatus GK (depicted in FIG. 5). Each function will be described below.

Figure 3:
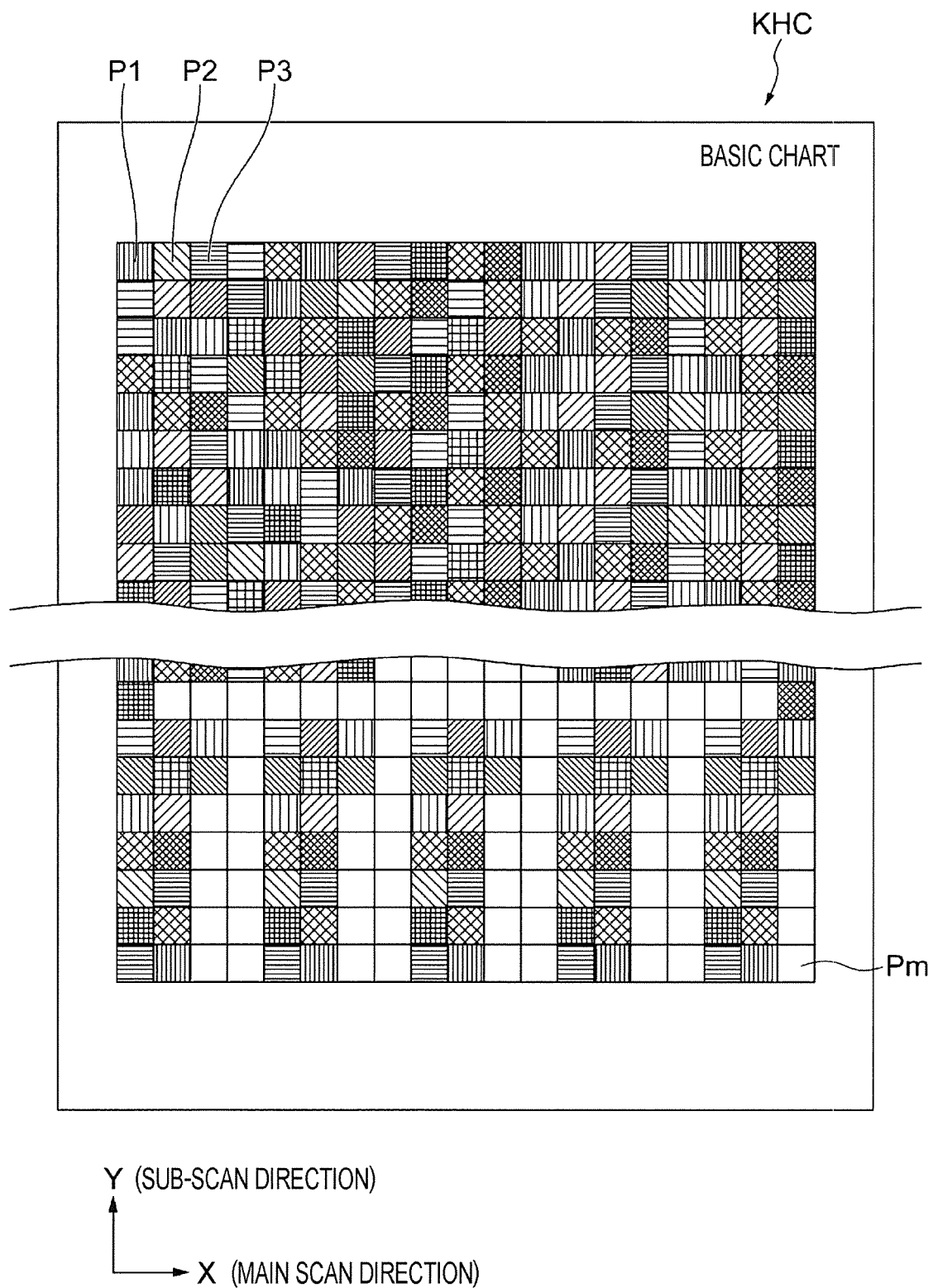
FIG. 3 illustrates a configuration of a basic chart according to the first exemplary embodiment.

FIG. 3 illustrates a configuration of the basic chart KHC according to the first exemplary embodiment.

The basic chart KHC is used for creating the color conversion profile of the image processing apparatus GS as mentioned above. Thus, as illustrated in FIG. 3, the basic chart KHC is printed on a print medium (for example, an A3-sized sheet for printing) so that a plurality of patches P1 to Pm each of which has a square shape are arranged in a rectangular shape as a whole, or more precisely, form a rectangle as a whole, where m is any integer equal to two or larger. The plurality of patches P1 to Pm are an example of "a plurality of color samples included in the first color chart". As illustrated in FIG. 3, the X direction is defined as the main scan direction, and the Y direction is defined as the sub-scan direction. The main scan direction is a scan direction in which the image processing apparatus GS scans the basic chart KHC or the simplified chart KNC described above by using a scanner (not depicted) to create the color conversion profile mentioned above, and the sub-scan direction is a direction perpendicular to the main scan direction.

Figure 4:
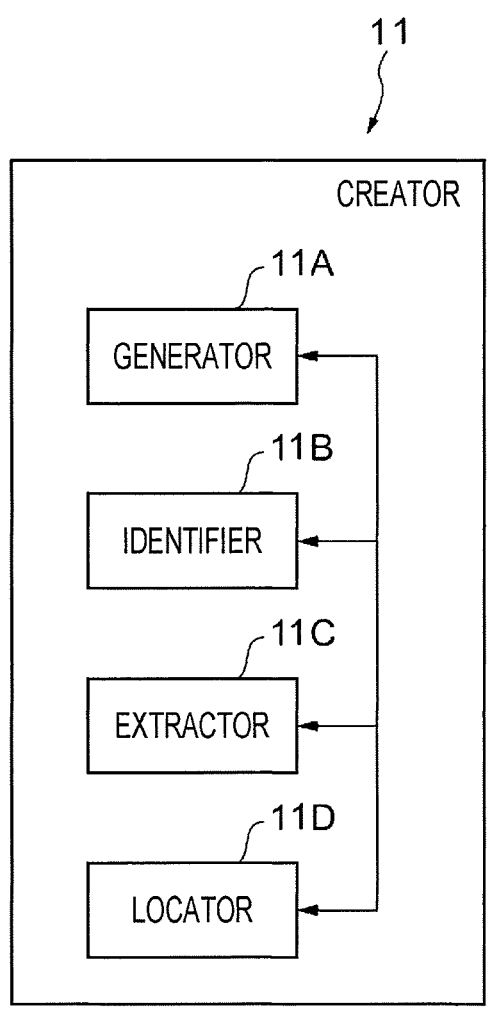
FIG. 4 is a functional block diagram of a creator according to the first exemplary embodiment.

FIG. 4 is a functional block diagram of the creator 11 according to the first exemplary embodiment.

As illustrated in FIG. 4, the creator 11 (depicted in FIG. 2) includes a generator 11A, an identifier 11B, an extractor 11C, and a locator 11D. Each function will be described below.

Figure 5:
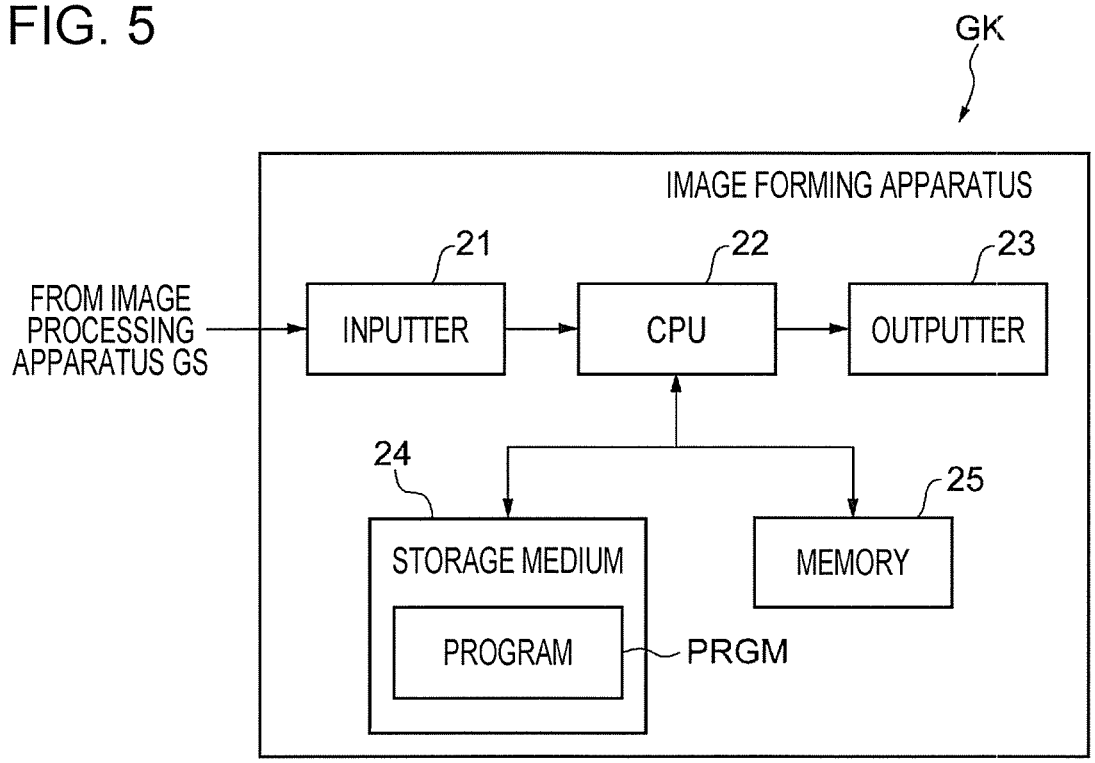
FIG. 5 illustrates a configuration of an image forming apparatus according to the first exemplary embodiment.

FIG. 5 illustrates a configuration of the image forming apparatus according to the first exemplary embodiment. The configuration of an image forming apparatus GK according to the first exemplary embodiment will be described below with reference to FIG. 5.

The image forming apparatus GK according to the first exemplary embodiment includes an inputter 21, a CPU 22, an outputter 23, a storage medium 24, and a memory 25 as illustrated in FIG. 5.

The inputter 21 has a basic configuration similar to the inputter 1 of the image processing apparatus GS described above (depicted in FIG. 1) and is constituted, for example, by a keyboard, a mouse, and a touch panel, and further by a network connection unit. The CPU 22, which is similar to the CPU 2 of the image processing apparatus GS described above, is an example of a processor and a core of a widely known computer and operates hardware in accordance with software control. The outputter 23, which is similar to the outputter 3 of the image processing apparatus GS described above, is constituted, for example, by a printer, a liquid crystal monitor, and a network connection unit. The storage medium 24, which is similar to the storage medium 4 of the image processing apparatus GS described above, is constituted, for example, by an HDD, an SSD, and/or a ROM. The memory 25, which is similar to the memory 5 of the image processing apparatus GS described above, is constituted, for example, by a DRAM and/or an SRAM.

As depicted in FIG. 5, the storage medium 24 stores a program PRGM.

Figure 6:
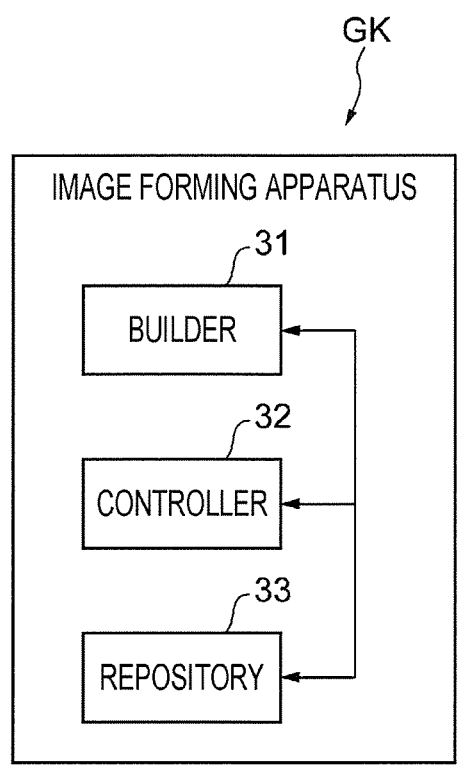
FIG. 6 is a functional block diagram of the image forming apparatus according to the first exemplary embodiment.

FIG. 6 is a functional block diagram of the image forming apparatus GK according to the first exemplary embodiment.

The image forming apparatus GK includes a builder 31, a controller 32, and a repository 33 as illustrated in FIG. 6.

The hardware configuration and the functional configuration of the image forming apparatus GK are related in such a manner that the CPU 22 executes on hardware the program PRGM stored in the storage medium 24, which realizes a portion of the function of the repository 33, by using the memory 25, which realizes another portion of the function of the repository 33. The CPU 22 controls operations of the inputter 21 and the outputter 23 on hardware as necessary and realizes functions of the builder 31 and the controller 32. In particular, the builder 31 corresponds to a printer, which is the outputter 23, more precisely to a printer that forms an image on a sheet by using an electrophotographic system or an inkjet recording system. Further, other printing systems, such as an offset printing system, a letterpress printing system, and a gravure printing system, may be used. Consequently, for example, the image forming apparatus GK prints the simplified chart KNC received from the image processing apparatus GS by using the outputter 23. Each function will be described below.

Operations in First Exemplary Embodiment

Operations of the image processing apparatus GS and the image forming apparatus GK according to the first exemplary embodiment will be described.

Figure 7:
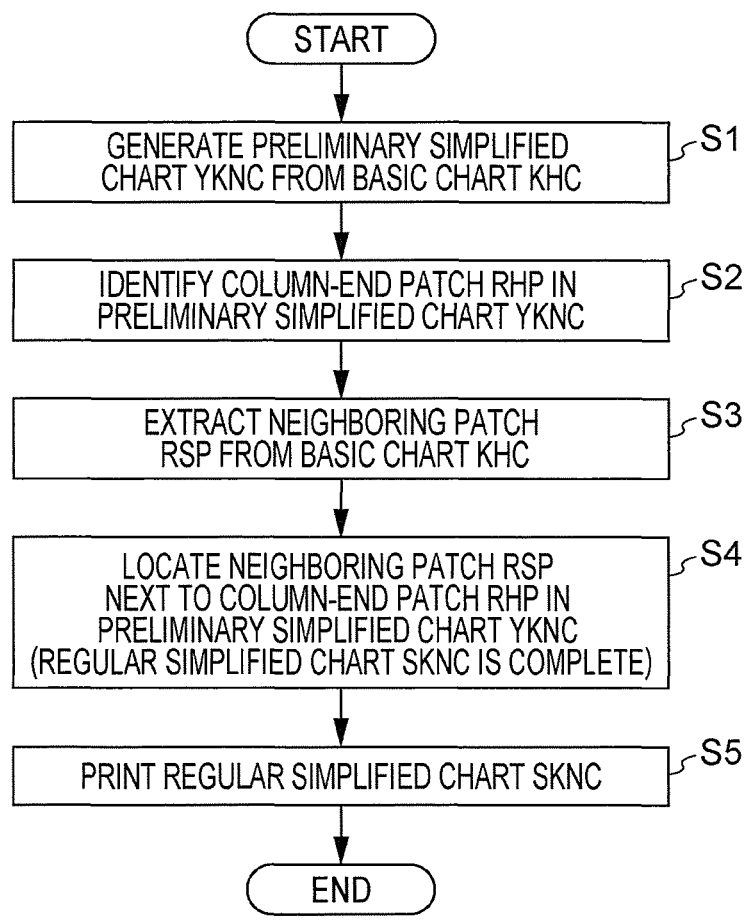
FIG. 7 is a flowchart illustrating operations of the image processing apparatus and the image forming apparatus according to the first exemplary embodiment.

FIG. 7 is a flowchart illustrating operations of the image processing apparatus GS and the image forming apparatus GK according to the first exemplary embodiment. Operations of the image processing apparatus GS and the image forming apparatus GK according to the first exemplary embodiment will be described below with reference to the flowchart in FIG. 7. For the sake of easy description and understanding, the production of the simplified chart KNC is divided into the production of a preliminary simplified chart YKNC and the production of a regular simplified chart SKNC below. The regular simplified chart SKNC is equivalent to the simplified chart KNC. In contrast, the preliminary simplified chart YKNC is an intermediate product created during a process of creating the regular simplified chart SKNC. Details will be described below.

In step S1, the CPU 2 (depicted in FIG. 1) in the image processing apparatus GS (depicted in FIG. 1) functions as the generator 11A in the creator 11 (depicted in FIG. 4) and generates the preliminary simplified chart YKNC from the basic chart KHC (depicted in FIG. 3).

Figure 8:
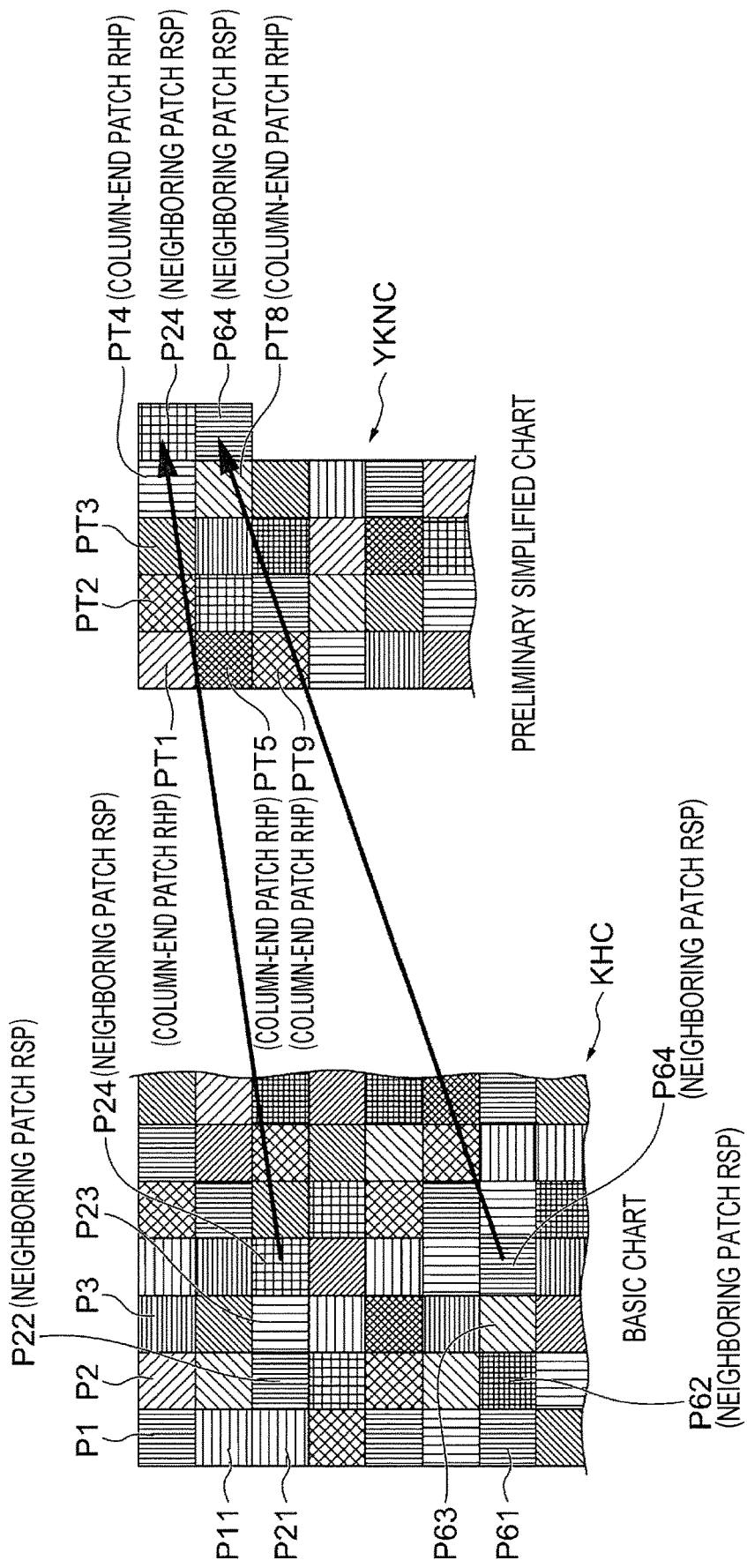
FIG. 8 illustrates a preliminary simplified chart according to the first exemplary embodiment.

More specifically, the CPU 2 generates as the generator 11A the preliminary simplified chart YKNC by using a method known in the art so that the preliminary simplified chart YKNC can represent a color gamut equivalent or similar to the color gamut provided by the basic chart KHC (the range of colors that can be represented by the color space of the basic chart KHC). As illustrated in FIG. 8, the preliminary simplified chart YKNC is formed by at least some patches PT1 to PTn (PTn is not depicted in FIG. 8) selected from the plurality of patches P1 to Pm forming the basic chart KHC (depicted in FIG. 3), where n is an integer equal to 2 or larger and smaller than m. In other words, the preliminary simplified chart YKNC is formed by a plurality of patches PT1 to PTn culled from the plurality of patches P1 to Pm forming the basic chart KHC.

Referring back to FIG. 7, the description of the operation of the image processing apparatus GS will be continued.

In step S2, the CPU 2 functions as the identifier 11B in the creator 11 (depicted in FIG. 4) and identifies a column-end patch RHP of the plurality of patches PT1 to PTn in the preliminary simplified chart YKNC. A column-end patch RHP is a patch located at an edge of the arrangement of the plurality of patches PT1 to PTn. More precisely, as depicted in FIG. 8, of the plurality of patches PT1 to PTn forming the preliminary simplified chart YKNC, a column-end patch RHP is a patch having at least one adjacent patch missing in the X direction (depicted in FIG. 3), that is, the main scan direction. For example, the patches PT1, PT4, PT5, PT8, PT9, . . . are column-end patches RHP.

In step S3, the CPU 2 functions as the extractor 11C in the creator 11 (depicted in FIG. 4) and extracts a neighboring patch RSP from the basic chart KHC. A neighboring patch RSP is a patch at least maintaining a partial-adjacency relationship with a column-end patch RHP in the basic chart KHC. In FIG. 8, for example, a neighboring patch RSP for the patch PT4, which is a column-end patch RHP in the preliminary simplified chart YKNC, is a patch that is located in the basic chart KHC and that is adjacent in the X direction (the main scan direction) to the patch P23, which corresponds to the patch PT4. The patches P22 and P24 meet this requirement and are neighboring patches RSP. Similarly, in FIG. 8, for example, a neighboring patch RSP for the patch PT8, which is a column-end patch RHP in the preliminary simplified chart YKNC, is a patch that is located in the basic chart KHC and that is adjacent in the X direction (the main scan direction) to the patch P63, which corresponds to the patch PT8. The patches P62 and P64 meet this requirement and are neighboring patches RSP.

Referring back to FIG. 7, the description of the operation of the image processing apparatus GS will be continued.

Figure 9:
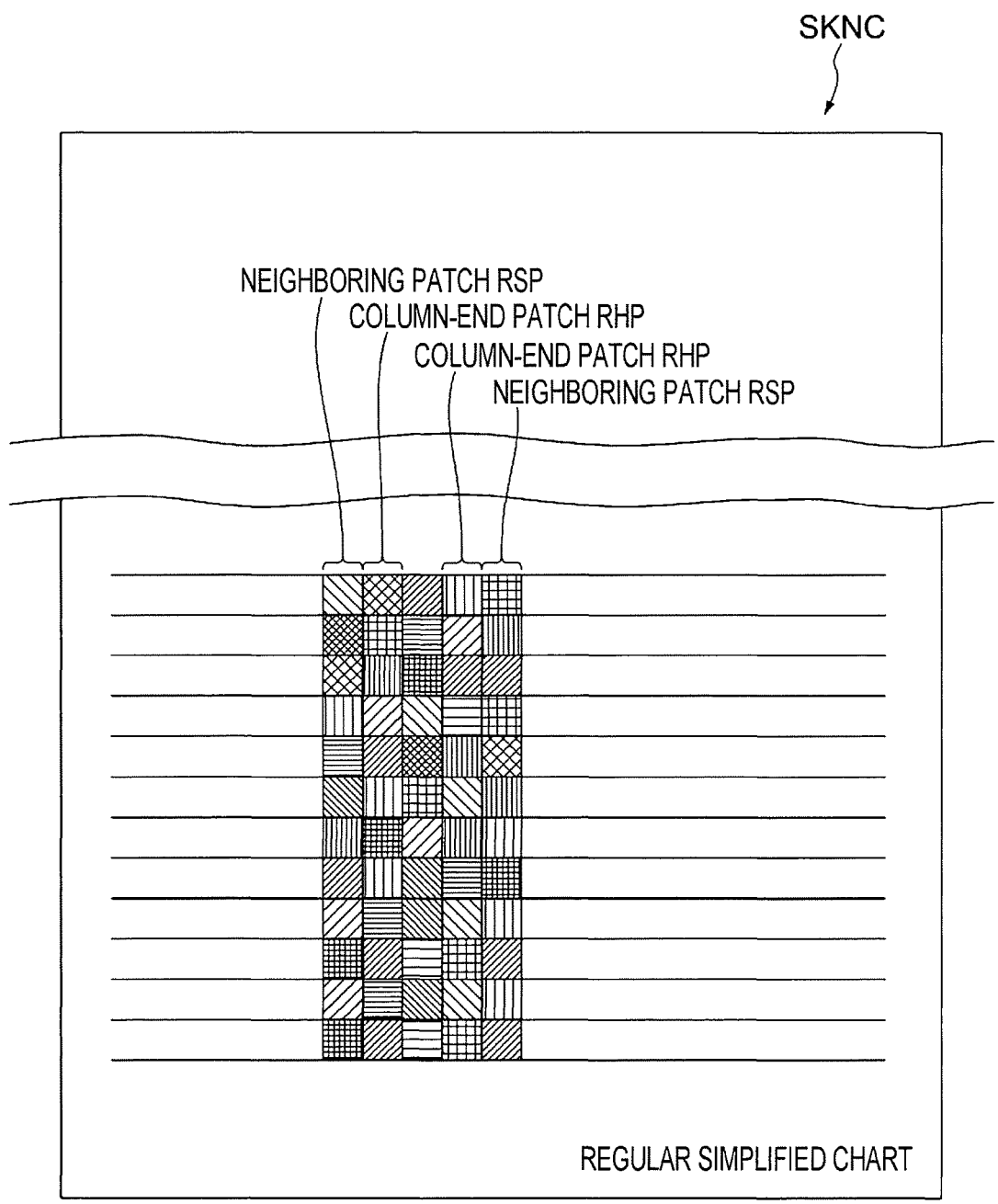
FIG. 9 illustrates a regular simplified chart according to the first exemplary embodiment.

In step S4, the CPU 2 functions as the locator 11D in the creator 11 (depicted in FIG. 4) and locates a neighboring patch RSP at a position adjacent to a column-end patch RHP in the preliminary simplified chart YKNC. In more detail, in FIG. 8, the CPU 2 locates one of the patches P22 and P24, for example, the patch P24, at an adjacent position on the right-hand side of the patch PT4, which is a column-end patch RHP having no adjacent patch on the right-hand side in the preliminary simplified chart YKNC. In the basic chart KHC, the patches P22 and P24 are neighboring patches RSP, which are adjacent to the patch P23, which corresponds to the patch PT4. Similarly, in FIG. 8, the CPU 2 locates one of the patches P62 and P64, for example, the patch P64, at an adjacent position on the right-hand side of the patch PT8, which is a column-end patch RHP having no adjacent patch on the right-hand side in the preliminary simplified chart YKNC. In the basic chart KHC, the patches P62 and P64 are neighboring patches RSP, which are adjacent to the patch P63, which corresponds to the patch PT8. Similarly to the arrangements described above, the CPU 2 also locates one of the neighboring patches RSP of each of the other column-end patches RHP, such as the patches PT1, PT5, and PT9, at an adjacent position on the left-hand side of the column-end patch RHP (not depicted). In this way, the regular simplified chart SKNC illustrated in FIG. 9 is complete.

Referring back to FIG. 7, the description of the operation will be continued.

In step S5, the CPU 22 in the image forming apparatus GK (depicted in FIG. 5) controls the operation of the builder 31 (depicted in FIG. 6), and thus the builder 31 forms an image of the regular simplified chart SKNC (depicted in FIG. 9) on a print medium. Namely, the builder 31 prints the regular simplified chart SKNC on the print medium.

Second Exemplary Embodiment

The effect of the operation of the image processing apparatus GS according to a second exemplary embodiment will be verified below.

Figure 10:
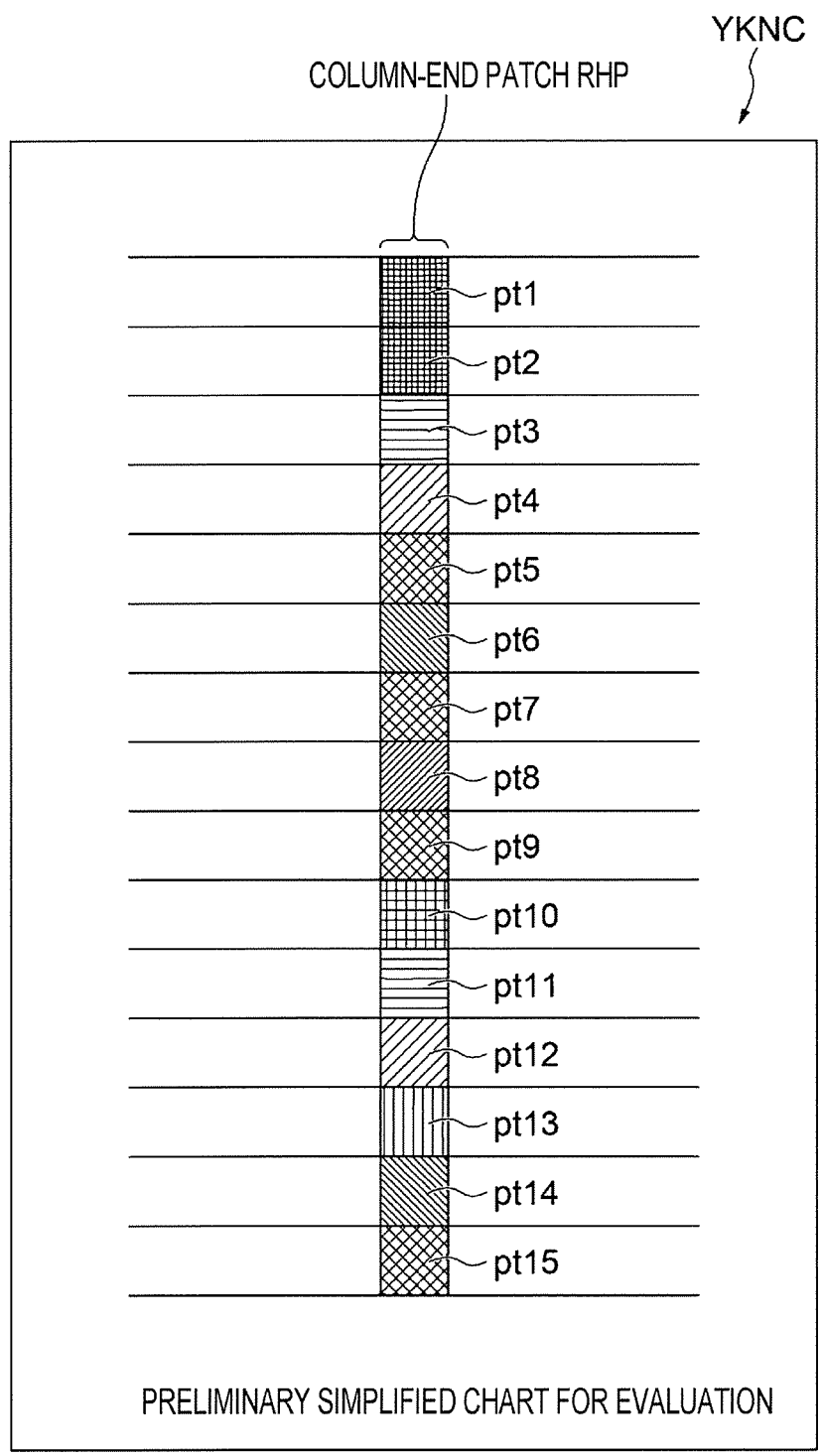
FIG. 10 illustrates a preliminary simplified chart for evaluation according to a second exemplary embodiment.
Figure 11:
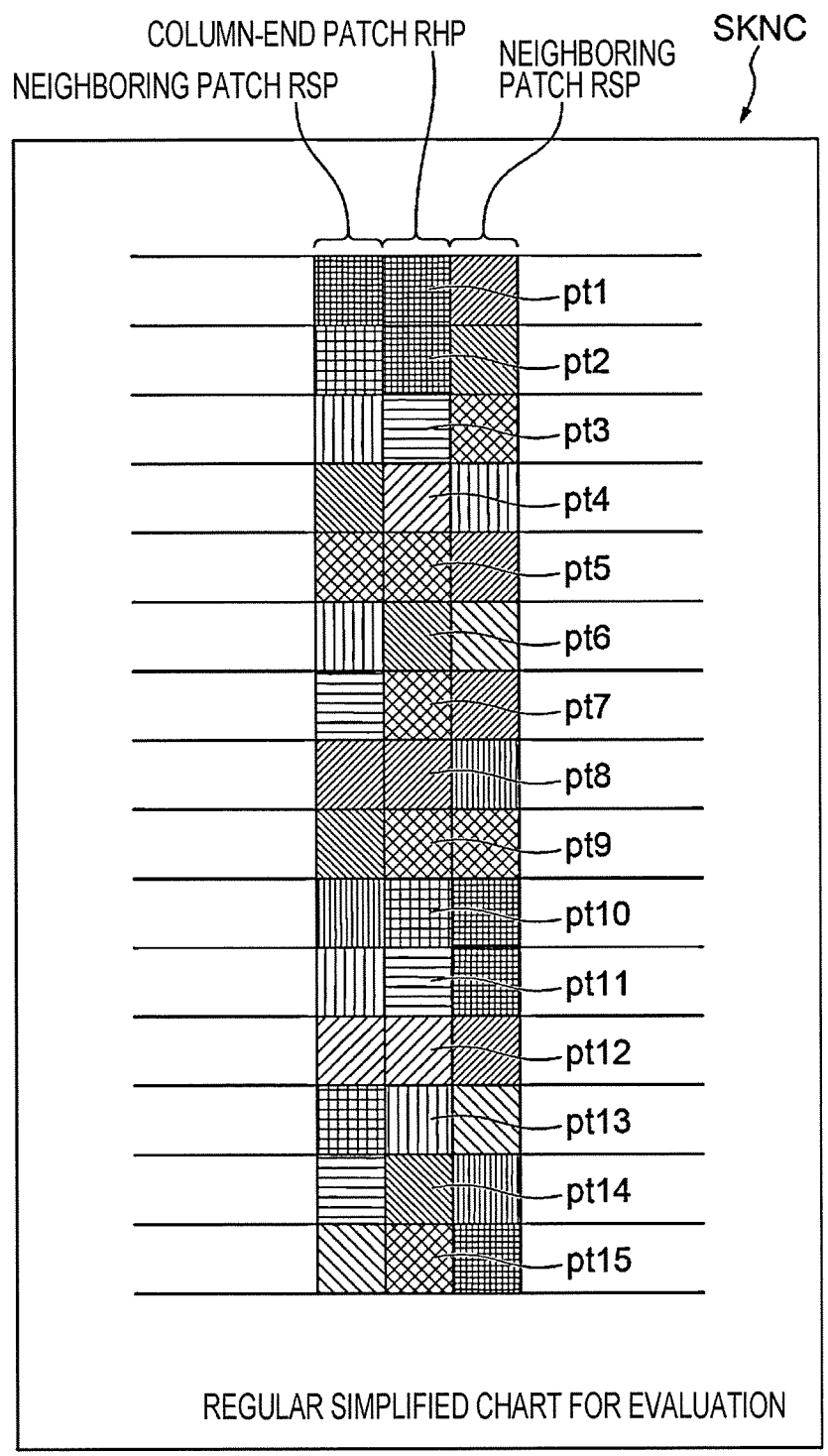
FIG. 11 illustrates a regular simplified chart for evaluation according to the second exemplary embodiment.

FIG. 10 illustrates a preliminary simplified chart for evaluation YKNC according to the second exemplary embodiment. FIG. 11 illustrates a regular simplified chart for evaluation SKNC according to the second exemplary embodiment.

The image processing apparatus GS according to the second exemplary embodiment (depicted in FIG. 1) operates in accordance with the flowchart illustrated in FIG. 7 and thus also generates the regular simplified chart for evaluation SKNC, which is illustrated in FIG. 11 and differs from the regular simplified chart SKNC, which is illustrated in FIG. 9. More specifically, the image processing apparatus GS generates the preliminary simplified chart for evaluation YKNC, which is illustrated in FIG. 10, from the basic chart KHC, which is illustrated in FIG. 3, and thereafter generates the regular simplified chart for evaluation SKNC, which is illustrated in FIG. 11. In FIG. 11, column-end patches RHP are denoted by pt1 to pt15, and pt1 to pt15 represent patch numbers of the column-end patches RHP.

Figure 12:
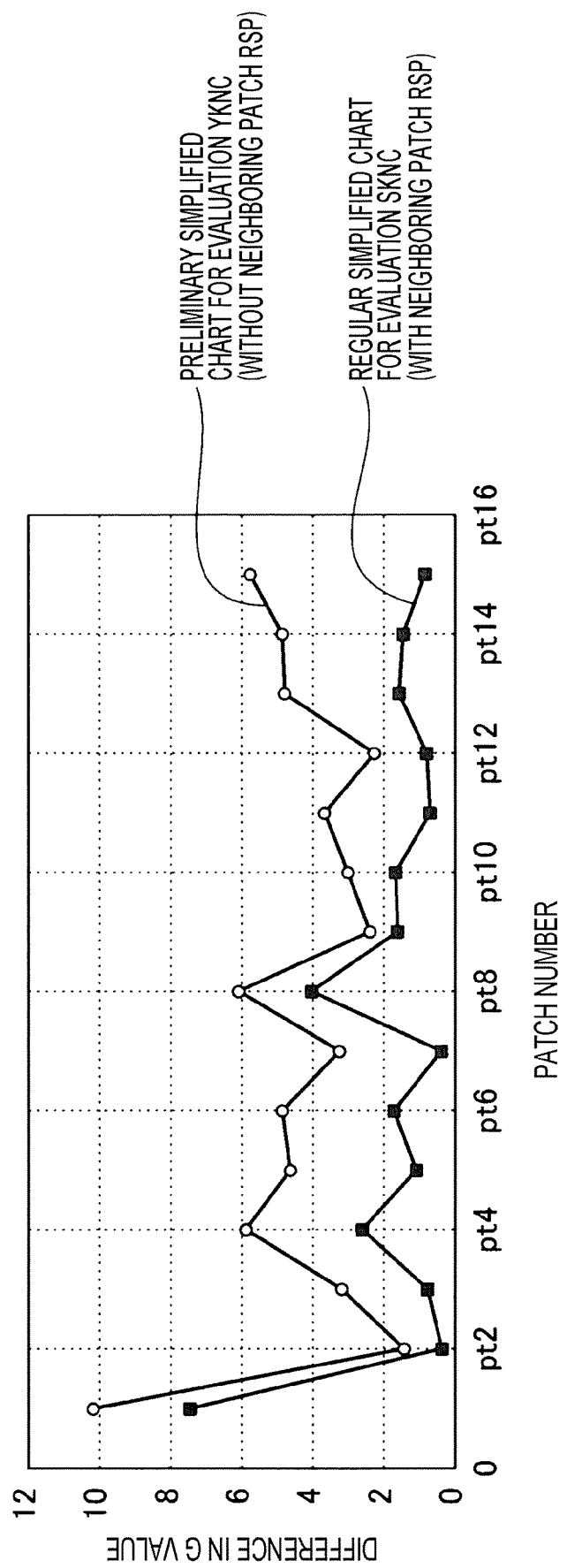
FIG. 12 illustrates differences in the G value between the basic chart and the preliminary simplified chart for evaluation according to the second exemplary embodiment and differences in the G value between the basic chart and the regular simplified chart for evaluation according to the second exemplary embodiment.
Figure 13:
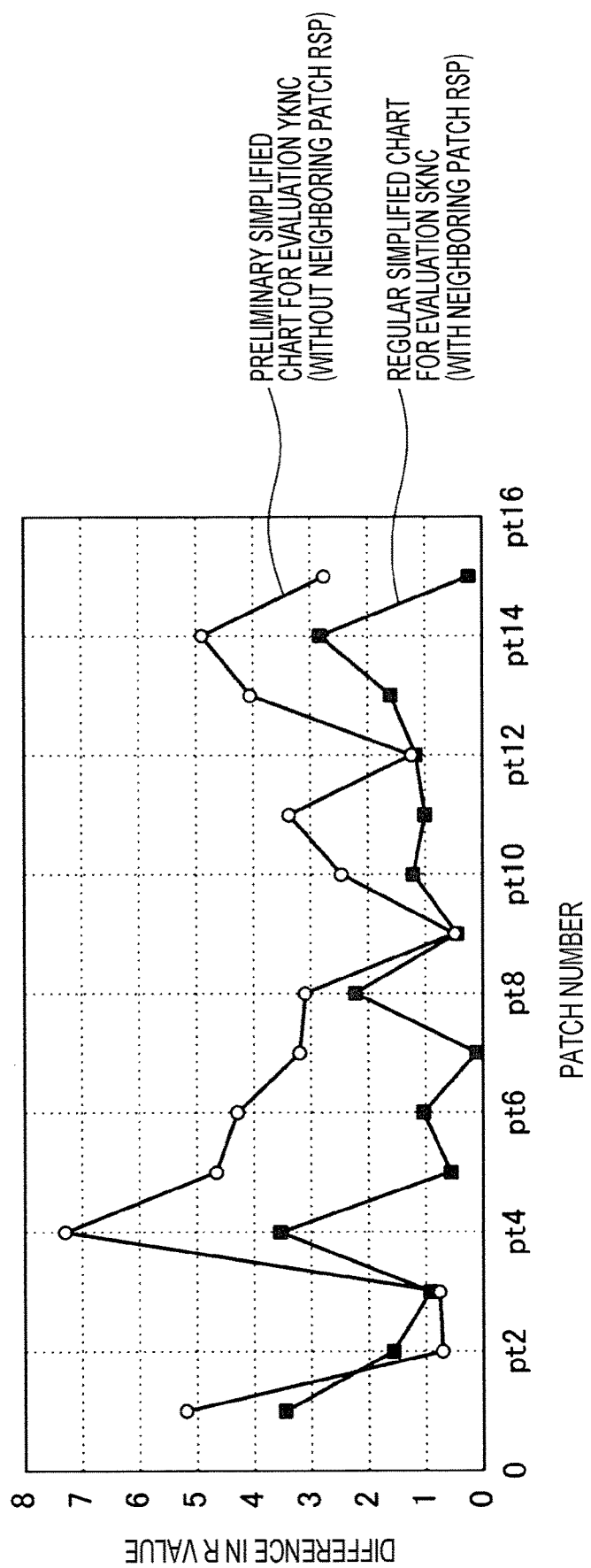
FIG. 13 illustrates differences in the R value between the basic chart and the preliminary simplified chart for evaluation according to the second exemplary embodiment and differences in the R value between the basic chart and the regular simplified chart for evaluation according to the second exemplary embodiment.
Figure 14:
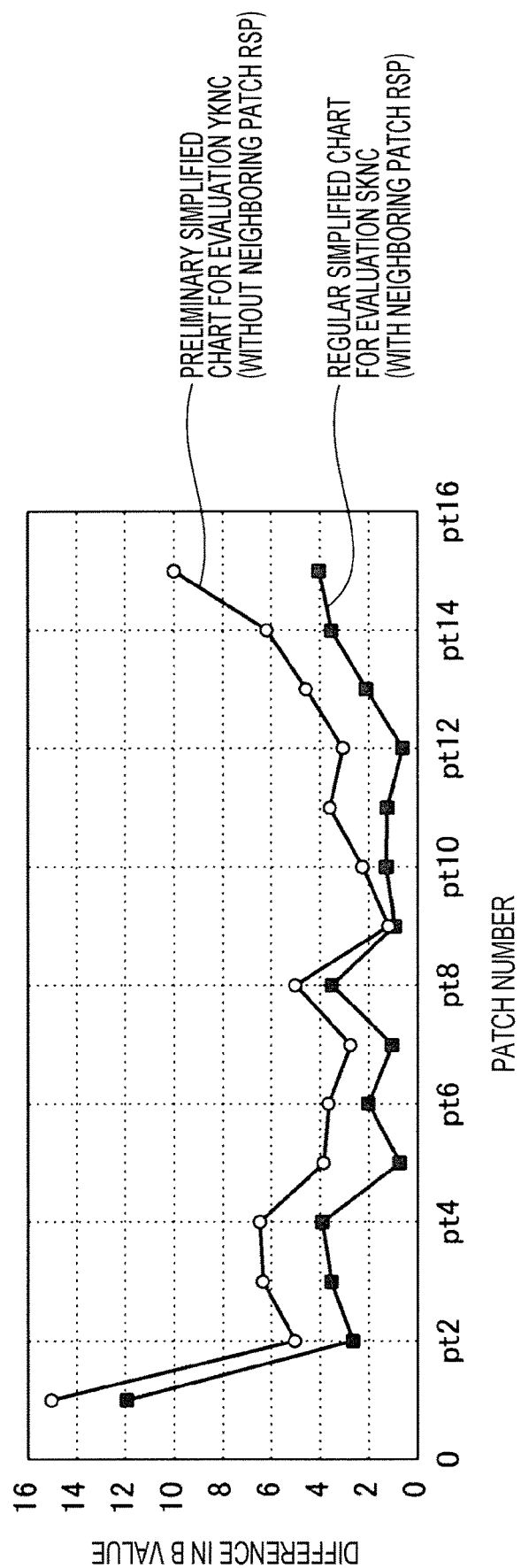
FIG. 14 illustrates differences in the B value between the basic chart and the preliminary simplified chart for evaluation according to the second exemplary embodiment and differences in the B value between the basic chart and the regular simplified chart for evaluation according to the second exemplary embodiment.

FIG. 12, FIG. 13, and FIG. 14 illustrate differences in the G value, the R value, and the B value, respectively, between the basic chart KHC and the preliminary simplified chart for evaluation YKNC according to the second exemplary embodiment. FIG. 12, FIG. 13, and FIG. 14 also illustrate differences in the G value, the R value, and the B value, respectively, between the basic chart KHC and the regular simplified chart for evaluation SKNC according to the second exemplary embodiment. A difference in the G value represents a difference for green, a difference in the R value represents a difference for red, and a difference in the B value represents a difference for blue.

The regular simplified chart for evaluation SKNC (depicted in FIG. 11), the preliminary simplified chart for evaluation YKNC (depicted in FIG. 10), and the basic chart KHC (depicted in FIG. 3) are scanned by using a scanner (not depicted) to create a color conversion profile. As illustrated in FIGS. 12, 13, and 14, the differences in the G value, the R value, and the B value between the regular simplified chart for evaluation SKNC and the basic chart KHC are smaller than the differences in the G value, the R value, and the B value between the preliminary simplified chart for evaluation YKNC and the basic chart KHC for almost all the column-end patches RHP, which are patches pt1 to pt15 (depicted in FIGS. 10 and 11). In other words, the characteristics (the G value, the R value, and the B value) that the regular simplified chart SKNC has and that are used for creating a color conversion profile are compared with the characteristics (the G value, the R value, and the B value) that the preliminary simplified chart YKNC has and that are used for creating a color conversion profile, and the comparison leads to a conclusion that the characteristics (the G value, the R value, and the B value) of the regular simplified chart SKNC are closer to the characteristics (the G value, the R value, and the B value) that the basic chart KHC has and that are used for creating a color conversion profile.

Figure 15:
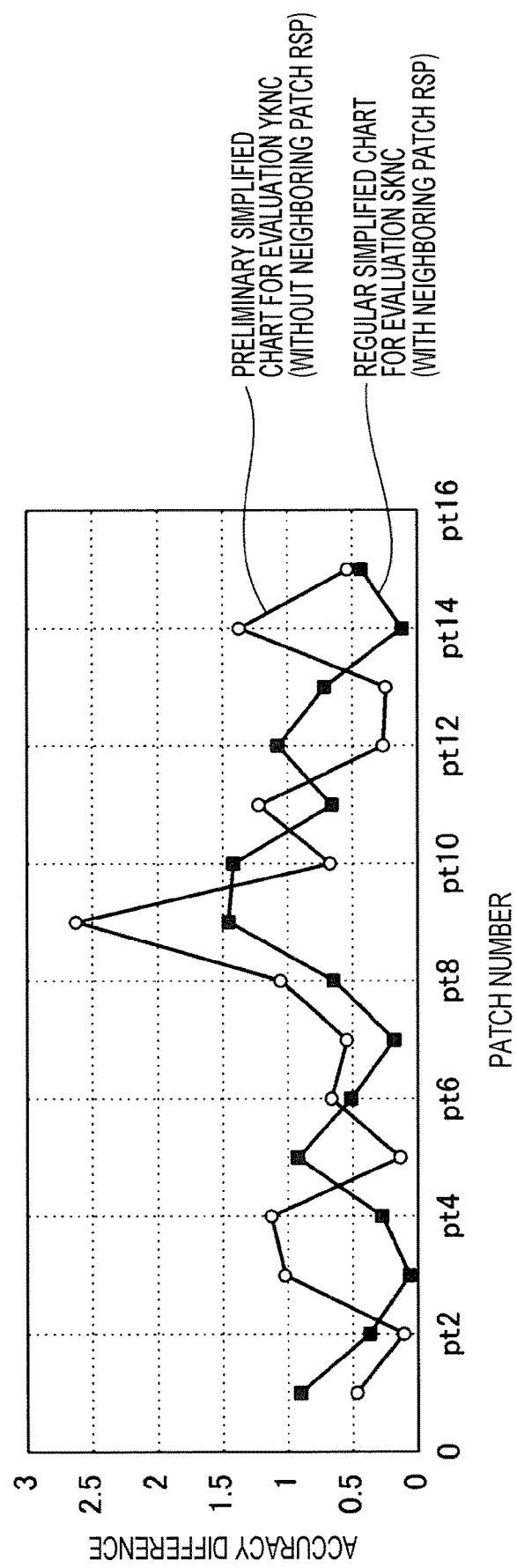
FIG. 15 illustrates accuracy differences between the regular simplified chart for evaluation and the basic chart according to the second exemplary embodiment and accuracy differences between the preliminary simplified chart for evaluation and the basic chart according to the second exemplary embodiment.

FIG. 15 illustrates accuracy differences between the regular simplified chart for evaluation SKNC and the basic chart KHC according to the second exemplary embodiment and accuracy differences between the preliminary simplified chart for evaluation YKNC and the basic chart KHC according to the second exemplary embodiment.

An accuracy in the accuracy differences illustrated in FIG. 15 represents a first value with respect to a second value in a color conversion profile in the L*a*b* color space, where the first value is converted from an RGB value obtained from a measurement of a chart by using a scanner (not depicted) and the second value is obtained from a measurement of the same chart by using a colorimeter (not depicted). For example, in the case of the basic chart KHC (depicted in FIG. 3), an accuracy represents a first value with respect to a second value in a color conversion profile in the L*a*b* color space, where the first value is converted from an RGB value obtained from a measurement of the basic chart KHC by using a scanner and the second value is obtained from a measurement of the basic chart KHC by using a colorimeter.

An accuracy difference represents an accuracy of a chart other than the basic chart KHC (for example, the regular simplified chart for evaluation SKNC) with respect to an accuracy of the basic chart KHC.

In FIG. 15, the average of accuracy differences each of which represents an accuracy of the preliminary simplified chart for evaluation YKNC with respect to an accuracy of the basic chart KHC is determined to be 0.71 for the column-end patches RHP, which are the patches pt1 to pt15 (depicted in FIGS. 10 and 11). In contrast, the average of the accuracy differences each of which represents an accuracy of the regular simplified chart for evaluation SKNC with respect to the accuracy of the basic chart KHC is determined to be 0.62. This result leads to a conclusion that the color gamut of the regular simplified chart SKNC, in which neighboring patches RSP are located adjacent to column-end patches RHP, is closer to the color gamut of the basic chart KHC than the color gamut of the preliminary simplified chart YKNC, in which no neighboring patch RSP is located adjacent to a column-end patch RHP, is.

Modification

In the first exemplary embodiment and the second exemplary embodiment, a neighboring patch RSP is located at a position adjacent to a column-end patch RHP in the X direction, which is the main scan direction (depicted in FIG. 3). Instead, a neighboring patch RSP may be located at a position adjacent to a row-end patch in the Y direction, which is the sub-scan direction (depicted in FIG. 3). Of the plurality of patches PT1 to PTn forming the preliminary simplified chart YKNC, a row-end patch is a patch having at least one adjacent patch missing in the sub-scan direction, which is the Y direction. Further, for example, a neighboring patch RSP in the modification is a patch that is located in the basic chart KHC (depicted in FIG. 3) and that is adjacent in the Y direction (the sub-scan direction) to a patch corresponding to a row-end patch in the preliminary simplified chart YKNC (depicted in FIG. 10).

Supplementary Description of Processor and Program

In the first exemplary embodiment and the second exemplary embodiment described above, the term "processor" refers to hardware in a broad sense. Examples of the processor include general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the first exemplary embodiment and the second exemplary embodiment described above, the term "processor" is broad enough to encompass one processor or plural processors in collaboration which are located physically apart from each other but may work cooperatively. The order of operations of the processor is not limited to one described in the first exemplary embodiment and the second exemplary embodiment described above, and may be changed.

In the first exemplary embodiment and the second exemplary embodiment described above, the programs PRG and PRGM may be stored in a recording medium, such as a compact disc read-only memory (CD-ROM), a digital versatile disc read-only memory (DVD-ROM), or a universal serial bus (USB) memory and provided or may be downloaded from an external apparatus via a network instead of being stored (installed) in advance in the storage media 4 and 24.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
a processor configured to
generate a preliminary simplified color chart including a plurality of color samples from a basic color chart having a plurality of color samples;
identifying column-end color samples in the preliminary simplified color chart;
extracting neighboring color samples from the basic color chart;
locating the neighboring color samples next to the column-end color samples in the preliminary simplified color chart to generate a regular simplified color chart,
wherein all of the color samples of the regular simplified color chart are selected from the color samples of the basic color chart, the regular simplified color chart being generated in such a manner that a color sample included in the regular simplified color chart is located in the regular simplified color chart at a position at least maintaining a partial-adjacency relationship in the basic color chart.

2. The image processing apparatus according to claim 1, wherein the partial-adjacency relationship represents a relationship in which two color samples are adjacent to each other in one of two directions that are a main scan direction and a sub-scan direction that is perpendicular to the main scan direction, the two directions being defined for a scan of the regular simplified color chart.

3. The image processing apparatus according to claim 2, wherein a color sample in the regular simplified color chart is located at one end in the one of the two directions in the regular simplified color chart, a color sample in the basic first color chart corresponds to the color sample in the regular simplified color chart, and a color sample located at a position adjacent to the color sample in the basic color chart is located at a position adjacent to the color sample in the regular simplified color chart.

4. An image forming apparatus comprising:
a processor configured to
operate based on a color chart generated by the image processing apparatus according to claim 1, and
form the regular simplified color chart on a recording medium.

5. A non-transitory computer readable medium storing a program causing a computer to execute a process for image processing, the process comprising:
generating a preliminary simplified color chart including a plurality of color samples from a basic first color chart having a plurality of color samples;
identifying column-end color samples in the preliminary simplified color chart;
extracting neighboring color samples from the basic color chart;
locating the neighboring color samples next to the column-end color samples in the preliminary simplified color chart to generate a regular simplified color chart,
wherein all of the color samples of the regular simplified color chart are selected from the color samples of the basic color chart, the regular simplified color chart being generated in such a manner that a color sample included in the regular simplified color chart is located in the regular simplified color chart at a position at least maintaining a partial-adjacency relationship in the basic color chart.

* * * * *